United States Patent
Lambert

(10) Patent No.: US 7,103,943 B2
(45) Date of Patent: Sep. 12, 2006

(54) MULTI-PURPOSE UTILITY STRAP AND METHOD THEREFOR

(76) Inventor: Jeffrey J. Lambert, 178 E. Liana Dr., Chino Valley, AZ (US) 86323

( * ) Notice: Subject to any disclaimer, the term of this patent is extended or adjusted under 35 U.S.C. 154(b) by 96 days.

(21) Appl. No.: 10/878,840

(22) Filed: Jun. 28, 2004

(65) Prior Publication Data

US 2004/0262353 A1 Dec. 30, 2004

Related U.S. Application Data

(60) Provisional application No. 60/483,977, filed on Jun. 28, 2003.

(51) Int. Cl.
*A44B 21/00* (2006.01)
*A45F 3/14* (2006.01)
*A62B 35/00* (2006.01)

(52) U.S. Cl. .............. 24/298; 24/182; 24/302; 119/792; 224/258; 182/3

(58) Field of Classification Search ............... 24/298, 24/302, 115 H, 71.1; D3/327
See application file for complete search history.

(56) References Cited

U.S. PATENT DOCUMENTS

| | | | | |
|---|---|---|---|---|
| 2,979,028 A | * | 4/1961 | Zakely ................. | 182/6 |
| 4,700,818 A | * | 10/1987 | Orwin .................. | 190/27 |
| D390,704 S | * | 2/1998 | Bloch .................. | D3/327 |
| 6,637,077 B1 | * | 10/2003 | Doty ................... | 24/298 |

* cited by examiner

*Primary Examiner*—Robert J. Sandy
(74) *Attorney, Agent, or Firm*—Jeffrey D. Moy; Harry M. Weiss; Weiss & Moy, P. C.

(57) ABSTRACT

A multi use utility strap has an elongated first strap member. The first strap member has a first end and a second end. The first end is folded over and coupled to a body section of the elongated strap to form a first loop. The second end is folded over and coupled to the body section to form a second loop. A second strap member having a first end and a second end is provided wherein the first end is coupled to the first strap member. A first pair of D rings is positioned in the second loop. A third strap member is provided having a first end and a second end. The first end of the third strap is folded over and coupled to a body section of the third strap member to form a third strap member loop. A connector is provided for coupling the second strap member to the third strap member.

16 Claims, 6 Drawing Sheets

MULTI-PURPOSE UTILITY STRAP AND METHOD THEREFOR

RELATED APPLICATIONS

This patent application is claiming the benefit of U.S. Provisional Application entitled "K'nelt", filed on Jun. 28, 2003, having a Ser. No. 60/483,977, and in the name of Jeffrey J. Lambert.

BACKGROUND OF THE INVENTION

1. Field of the Invention

This invention relates to a strap and, more specifically, to a utility strap which may be used for a variety of different purposes.

2. Description of the Prior Art

People who are active generally require the use of a rope or utility strap in their activities. Most ropes or utility straps are generally a long rounded or flat strap made out of a nylon material or the like. Many people use the rope or utility strap for different purposes. For example, people will use the rope or utility strap to tie objects together, to tie objects to a vehicle, to help in carrying different objects, and the like.

While a rope and a utility strap are useful devices, both of the aforementioned products have certain problems associated with them. The biggest problem is the limited functionality of the rope and utility strap. Because of their respective design (a long rounded or flat strap), the uses of the rope and/or strap is greatly limited. By adding additional pieces to the rope and/or utility strap, the functionality of these items may be greatly increased. Another problem associated with these items is that these items are never around when one needs to use them. Most people generally don't carry around a rope and/or utility strap. Most ropes and/or utility straps are too big and bulky for a person to carry.

Therefore, there is a need for an improved utility strap. The improved utility strap must overcome the problems associated with prior art utility straps. The improved utility strap must have increased functionality. The improved utility strap must further be easy for one to carry.

SUMMARY OF THE INVENTION

In accordance with one embodiment of the present invention, it is an object of the present invention to provide an improved utility strap.

It is another object of the present invention to provide an improved utility strap that overcomes the problems associated with prior art utility straps.

It is another object of the present invention to provide an improved utility strap that has increased functionality.

It is still another object of the present invention to provide an improved utility strap that is easy for one to carry.

BRIEF DESCRIPTION OF THE EMBODIMENTS

In accordance with one embodiment of the present a multi use utility strap is disclosed. The multi use utility strap has an elongated first strap member. The first strap member has a first end and a second end. The first end is folded over and coupled to a body section of the elongated first strap member to form a first loop. The second end is folded over and coupled to the body section to form a second loop. A second strap member having a first end and a second end is provided wherein the first end is coupled to the first strap member. A first pair of D rings is positioned in the second loop. A third strap member is provided having a first end and a second end. The first end of the third strap is folded over and coupled to a body section of the third strap member to form a third strap member loop. A connector is provided for coupling the second strap member to the third strap member.

The foregoing and other objects, features, and advantages of the invention will be apparent from the following, more particular, description of the preferred embodiments of the invention, as illustrated in the accompanying drawing.

BRIEF DESCRIPTION OF THE DRAWINGS

The novel features believed characteristic of the invention are set forth in the appended claims. The invention itself, as well as a preferred mode of use, and advantages thereof, will best be understood by reference to the following detailed description of illustrated embodiments when read in conjunction with the accompanying drawings.

DETAILED DESCRIPTION OF THE PREFERRED EMBODIMENT

Figure 1:
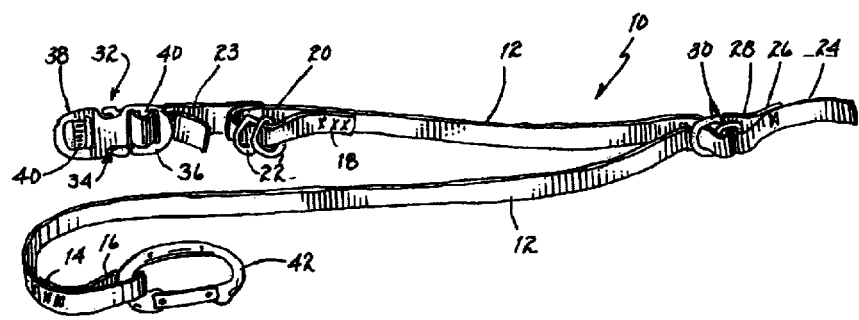
FIG. 1 is an elevated perspective view of the improved utility belt of the present invention with one end of the strap removed from the connector.
Figure 2:
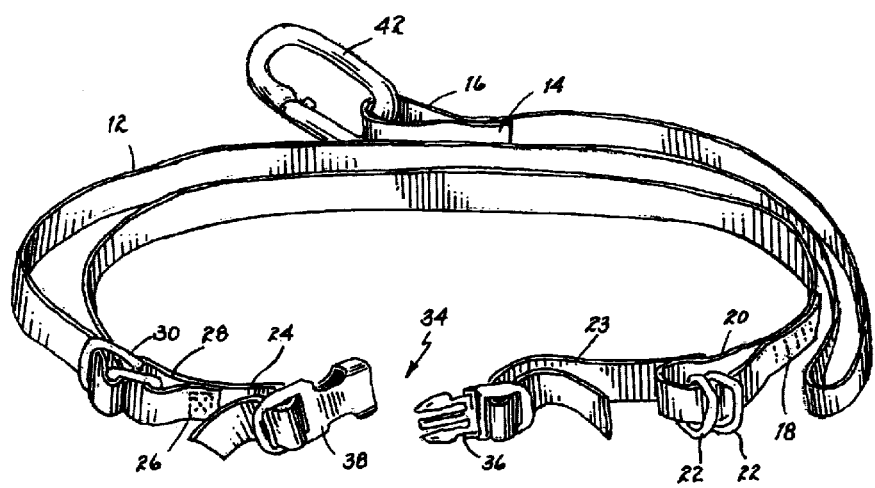
FIG. 2 is an elevated perspective view of the improved strap of the present invention assembled to be worn as a belt.
Figure 3:
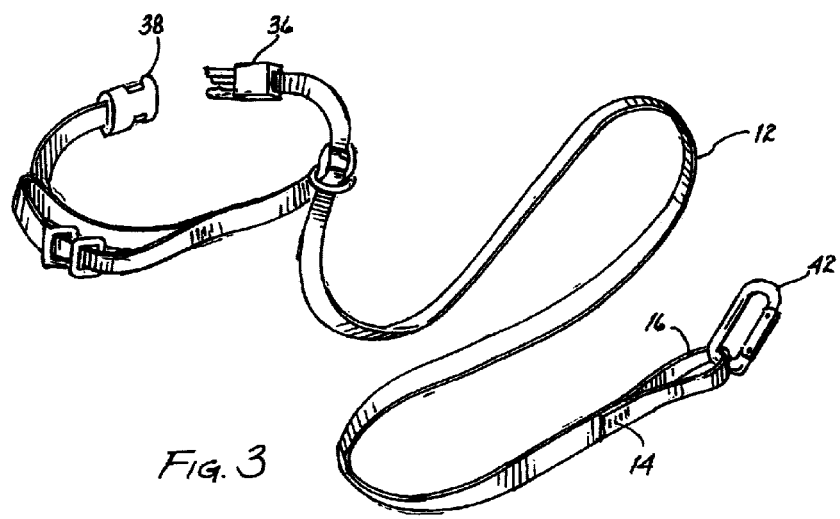
FIG. 3 is another elevated perspective view of the improved strap shown in FIG. 2.

Referring to FIGS. 1–3, elevated views of the improved utility strap 10 (hereinafter utility strap 10) are shown. The utility strap 10 has a long flat strap member 12. The strap member 12 is generally made of a nylon material. However, other materials may be used for the strap member 12 without departing from the spirit and scope of the present invention.

The strap member 12 may come in a plurality of different lengths and colors. In general, the strap member 12 will be approximately six feet in length.

A first end 14 of the strap member 12 is folded over and coupled back to the strap member 12 to form a first loop 16. The first loop 16 is generally a few inches in diameter. As may be seen more clearly in FIG. 3, the first end 14 is coupled to the strap member 12 in multiple places. This will provide for a stronger first loop 16.

A second end 18 of the strap member 12 is also folded over and coupled back to the strap member 12 to form a second loop 20. The second loop 20 is generally a few inches in diameter as well. As shown in FIGS. 1–3, the second end 18 is coupled to the strap member 12 in multiple places. This will provide for a stronger second loop 20.

Located in the second loop 20 are a pair of D rings 22. The D rings 22 will allow the utility strap 10 to be adjustable in length. By pulling the utility strap 10 through one or both D rings 22, one may adjust the length of the utility strap 10. This will be explained in more detail below.

Coupled to the second loop 20 is a first end of a second strap member 23. The second strap member 23 is generally made of the same material as the strap member 12. The second strap member 23 is shorter in length than the strap member 12. The second strap member 23 is generally four to six inches in length. However, this should not be seen as to limit the scope of the present invention.

A third strap member 24 is further provided. The third strap member 24 is generally made of the same material as the strap member 12 and the second strap member 22. The third strap member 24 has a first end 26 which is folded over and coupled to the body of the third strap member 24 to form a small loop 28. A second pair of D rings 30 is placed in the loop 28. The second pair of D rings 30 are also used to adjust the length of the utility strap 10.

A connector 32 is provided with the utility strap 10. The connector 32 is used to couple one end of the utility strap 10 to the other. In accordance with one embodiment of the present invention, the connector 32 is a male female connector 34. A first member 36 of the male female connector 34 is coupled to a second end of the second strap member 22. A second member 38 of the male female connector 34 is coupled to a second end of the third strap member 24. The first member 36 and the second member 38 both have a rod member 40. The rod member 40 allows one to further adjust the length of the utility strap 10.

A carabiner 42 is further provided with the utility strap 10. The carabiner 42 can be coupled to different parts of the utility strap 10. The carabiner 42 can be used to increase the functionality of the utility strap 10.

Figure 4:
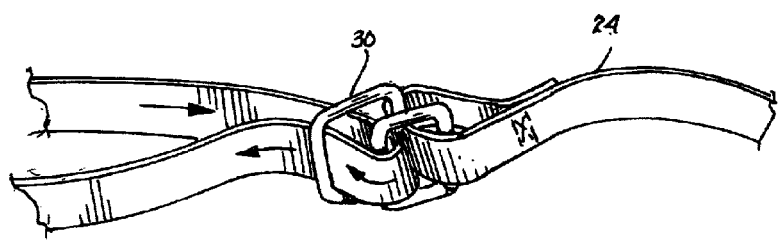
FIG. 4 is a close-up view of how to use the first set of D-rings.
Figure 5:
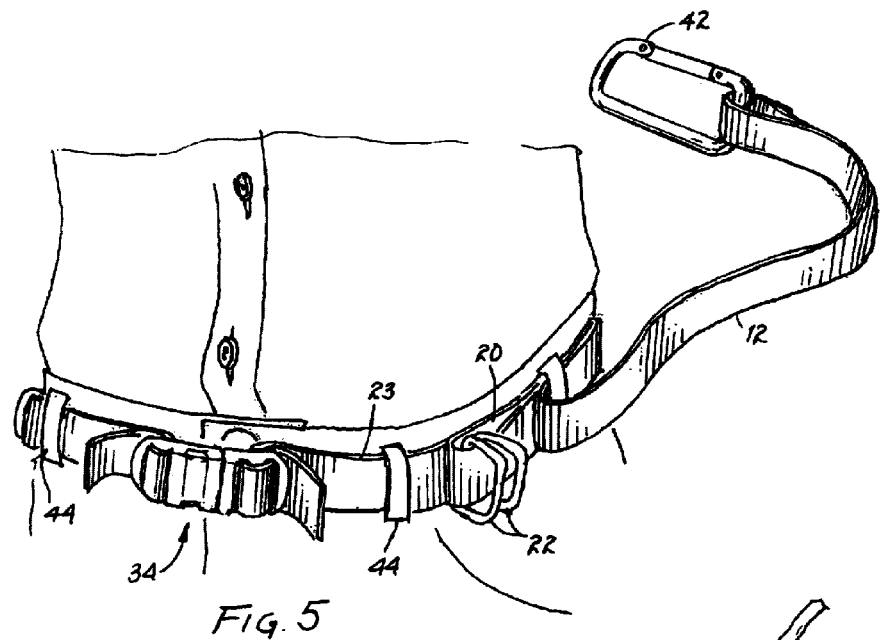
FIG. 5 is an elevated perspective view showing the improved utility strap being worn as a belt.

As shown in FIG. 5, one of the unique features of the utility strap 10 is that the utility strap 10 may be worn as a belt. Thus, one can wear the utility strap 10 thereby allowing one to easy carry the utility strap 10 and to have the utility belt 10 at all times. In order to wear the utility strap 10 as a belt, one attaches the third strap 24 to the strap member 12 at a distance equal to or greater than a user's waist. This is done by weaving the first loop 16 through the second set of D rings 30 as shown in FIGS. 1 and 4. The third strap 24 is then placed through the first set of D rings 22 on the strap member 12. The first connector 36 is then reattached to the third strap 24 by weaving the second end of the third strap 24 through the rod member 40 of the first connector 36. The first connector 36 and the second connector 38 are then coupled together. One may adjust the waist size by pulling the strap member 12 through the D rings 30. One may pull the excess strap member 12 tight and reverse direction at the wear's belt loop 44 or through the D rings 22. The excess strap may be worn loosely or brought back through the belt loop 44. The loop 16 is then attached to the belt loop 44, or the D rings 22 with the carabiner 42.

Figures 6, 7, 8:
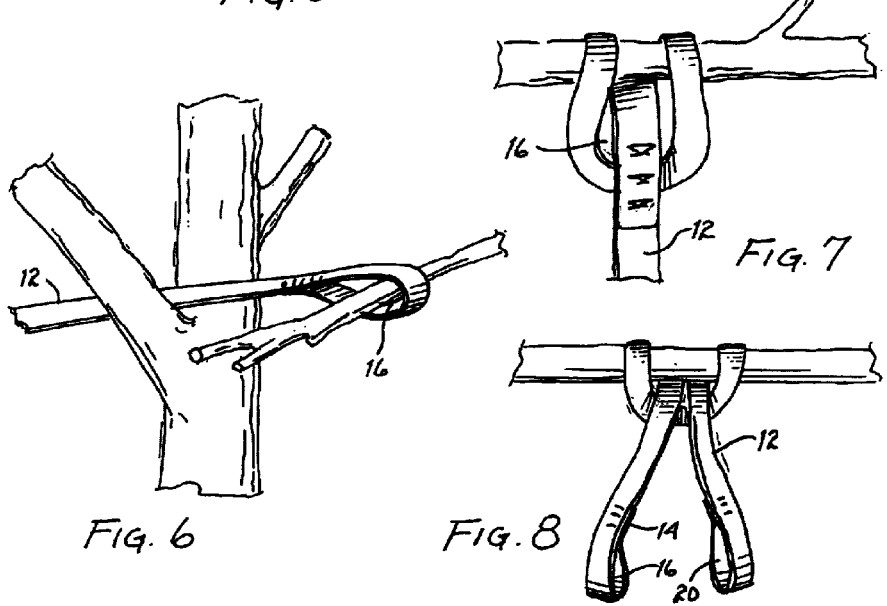
FIG. 6 is an elevated perspective view showing the improved utility strap of the present invention being coupled to a tree branch.
FIG. 7 is an elevated perspective view of showing the improved utility strap of the present invention being coupled to a tree branch in another manner.
FIG. 8 is an elevated perspective view of showing the improved utility strap of the present invention being coupled to a tree branch in yet another manner.
Figure 10:
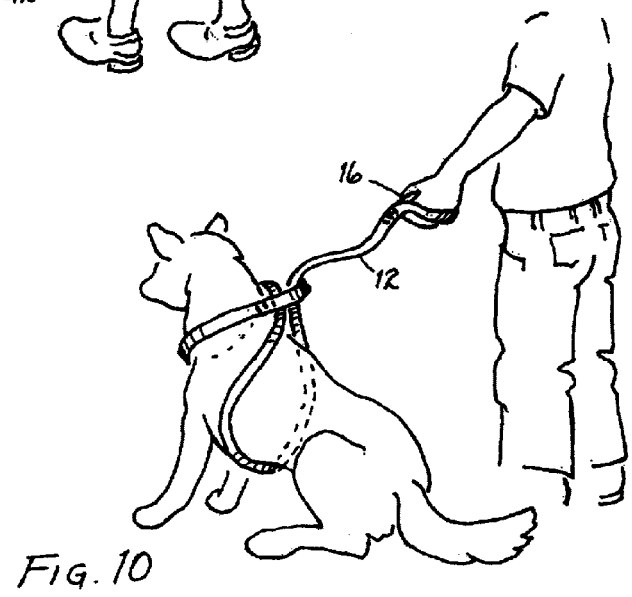
FIG. 10 is an elevated perspective view showing the improved utility strap of the present invention being used as an animal leash.
Figure 11:
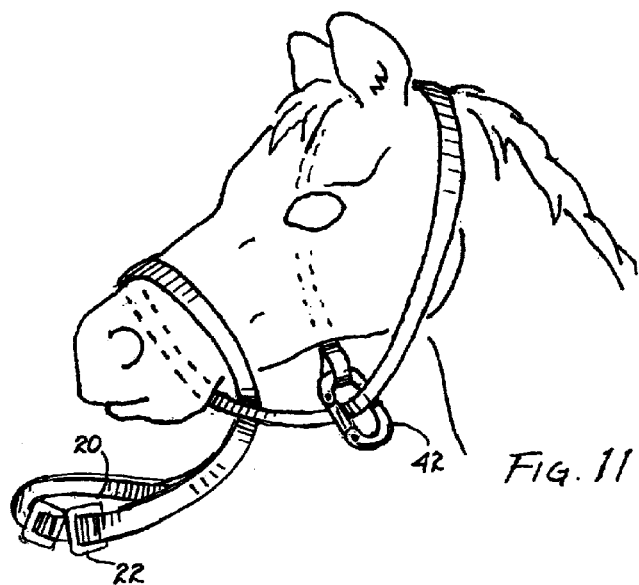
FIG. 11 is an elevated perspective view of showing the improved utility strap of the present invention being used as a bridle for a horse.
Figure 12:
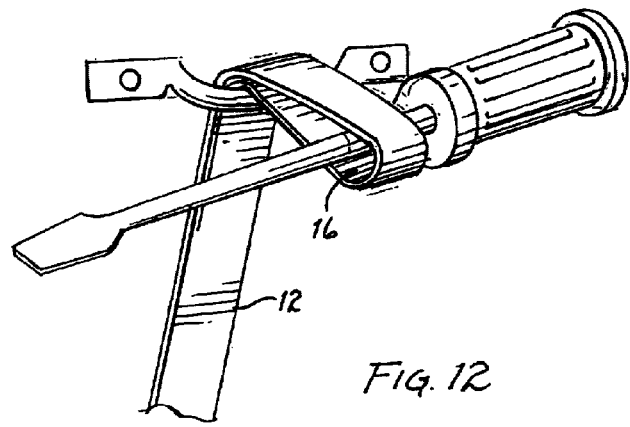
FIG. 12 is an elevated perspective view of showing the improved utility strap of the present invention being coupled to a handle.
Figure 13:
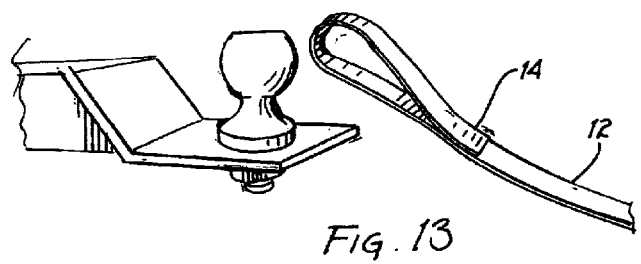
FIG. 13 is an elevated perspective view of showing the improved utility strap of the present invention being coupled to a trailer hitch.

The utility strap 10 has many different functions. The utility strap 10 may be used to tow and carry items. The loops 16 and 20 may be used as handles with any size item placed on top of one or more utility straps 10. Other uses are shown in FIGS. 5–14. The loops 16 and/or 20 may be placed over a plurality of objects. As shown in FIG. 13, the loop 16 is placed over a trailer hitch. This allows the utility strap 10 to function as a tow rope. Objects may also be inserted through the loops 16 and/or 20. As shown in FIG. 6, a branch 46 is placed through the loop 16. With the branch 46 in the loop 16, the utility strap 10 can be attached to a tree or other objects. FIG. 12 shows how a smaller object like a screwdriver 48 is inserted in the loop 16 to couple the utility strap 10 to a handle 50.

Figure 14:
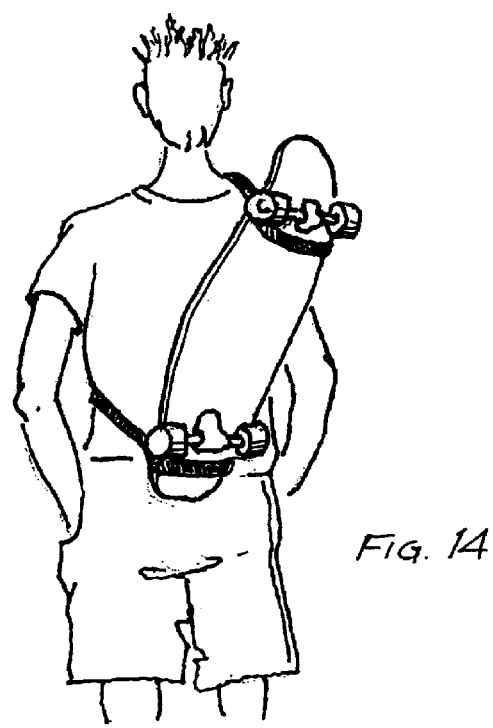
FIG. 14 is an elevated perspective view of showing the improved utility strap of the present invention being used to carry an item.

Simple knots may be made with the utility strap 10 to couple the utility strap 10 to an object. As shown in FIGS. 7 and 8, simple knots are done by simply pulling the utility strap 10 partially through or totally through a loop 16 and/or 20. Pulling the utility strap through the loop 16 and/or 20 is a good way to carry an item as shown in FIG. 14.

Multiple loop knots may also be made with the utility strap 10. Multiple loop knots are a good way to make halters for pets as shown in FIGS. 10 and 11.

Figure 9:
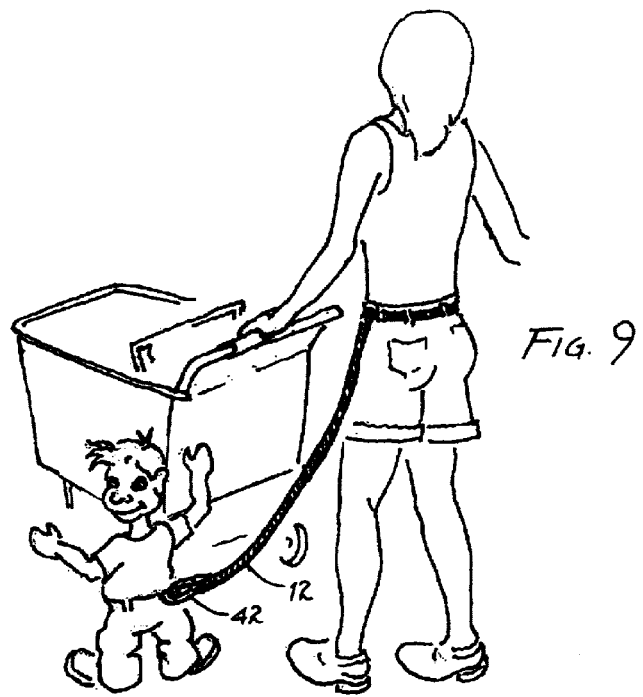
FIG. 9 is an elevated perspective view showing the improved utility strap of the present invention being used to keep a child from becoming lost.

As stated above, the utility strap 10 may be worn as a belt. When used as a belt, the utility strap 10 can be used in multiple configurations as a child/pet safety leash as shown in FIG. 9.

While the invention has been particularly shown and described with reference to preferred embodiments thereof, it will be understood by those skilled in the art that the foregoing and other changes in form and details may be made therein without departing from the spirit and scope of the invention.

What is claimed is:

1. A multi use utility strap comprising:
   an elongated first strap member having a first end and a second end wherein the first end is folded over and coupled to a body section of the first strap member to form a first loop and the second end is folded over and coupled to the body section of the first strap member to form a second loop;
   a second strap member having a first end and a second end wherein the first end of the second strap member is coupled to the first strap member;
   a first pair of D rings positioned in the second loop;
   a third strap member having a first end and a second end, the first end of the third strap being folded over and coupled to a body section of the third strap member to form a third strap member loop; and
   a connector for coupling the second strap member to the third strap member.

2. A multi use utility strap in accordance with claim 1 further comprising a second set of D rings positioned in the third strap member loop.

3. A multi use utility strap in accordance with claim 2 wherein the first set of D rings and the second of D rings are used for adjusting a length of the utility belt.

4. A multi use utility strap in accordance with claim 1 further comprising a carabiner coupled to one of a first loop, a second loop or the third strap member loop.

5. A multi use utility strap in accordance with claim 1 wherein the connector comprises:

a first connector coupled to a second end of the second strap member; and a second connector coupled to a second end of the third strap member.

6. A multi use utility strap in accordance with claim 1 wherein the connector is a male female connector.

7. A multi use utility strap in accordance with claim 1 wherein the first strap member, the second strap member, and the third strap member are made of a nylon material.

8. A multi use utility strap in accordance with claim 1 wherein the first strap member is approximately six feet in length.

9. A multi use utility strap in accordance with claim 1 wherein the second strap member and the third strap members are approximately six inches in length.

10. A multi use utility strap comprising:

an elongated first strap member having a first end and a second end wherein the first end is folded over and coupled to a body section of the first strap member to form a first loop and the second end is folded over and coupled to the body section of the first strap member to form a second loop;

a second strap member having a first end and a second end wherein the first end of the second strap member is coupled to the first strap member;

a first pair of D rings positioned in the second loop;

a third strap member having a first end and a second end, the first end of the third strap being folded over and coupled to a body section of the third strap member to form a third strap member loop;

a second pair of D rings positioned in the third strap member loop;

a connector for coupling the second strap member to the third strap member; and a carabiner coupled to one of the first loop, the second loop or the third strap member loop.

11. A multi use utility strap in accordance with claim 10 wherein the first pair of D rings and the second pair of D rings are used for adjusting a length of the utility belt.

12. A multi use utility strap in accordance with claim 10 wherein the connector comprises:

a first connector coupled to a second end of the second strap member; and a second connector coupled to a second end of the third strap member.

13. A multi use utility strap in accordance with claim 10 wherein the connector is a male female connector.

14. A multi use utility strap in accordance with claim 10 wherein the first strap member, the second strap member, and the third strap member are made of a nylon material.

15. A multi use utility strap in accordance with claim 10 wherein the first strap member is approximately six feet in length.

16. A multi use utility strap in accordance with claim 10 wherein the second strap member and the third strap members are approximately six inches in length.

* * * * *